(12) United States Patent
Pitera et al.

(10) Patent No.: US 11,181,505 B2
(45) Date of Patent: Nov. 23, 2021

(54) QUALITY TESTING OF ADDITIVE MANUFACTURED PRODUCT USING ELECTRICAL MEASUREMENTS

(71) Applicant: Rosemount Aerospace Inc., Burnsville, MN (US)

(72) Inventors: Rudy Pitera, Woodbury, MN (US); Greg Allen Seidel, Farmington, MN (US); Scott Wigen, Eagan, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 615 days.

(21) Appl. No.: 16/034,870

(22) Filed: Jul. 13, 2018

(65) Prior Publication Data

US 2020/0018724 A1    Jan. 16, 2020

(51) Int. Cl.
*G01N 27/90* (2021.01)
*G01N 27/9013* (2021.01)
*B22F 10/20* (2021.01)

(52) U.S. Cl.
CPC ......... *G01N 27/9046* (2013.01); *B22F 10/20* (2021.01); *G01N 27/902* (2013.01)

(58) Field of Classification Search
None
See application file for complete search history.

(56) References Cited

U.S. PATENT DOCUMENTS

| | | | |
|---|---|---|---|
| 4,791,354 A | 12/1988 | Wardell | |
| 9,662,839 B2 | 5/2017 | Napadensky | |
| 2012/0235693 A1* | 9/2012 | Feng | G01N 27/20 324/693 |
| 2016/0169821 A1 | 6/2016 | Meyer et al. | |
| 2016/0236414 A1* | 8/2016 | Reese | B33Y 50/02 |
| 2017/0284876 A1* | 10/2017 | Moorlag | B29C 64/106 |
| 2017/0312821 A1 | 11/2017 | DeFelice et al. | |
| 2017/0348900 A1 | 12/2017 | Williams et al. | |
| 2018/0120260 A1 | 5/2018 | Goldfine et al. | |

FOREIGN PATENT DOCUMENTS

WO    WO2016097911 A1    6/2016

OTHER PUBLICATIONS

Barron et al.; The Effect of Temperature on Conductivity Measurement; TSP, 2005, vol. 7.*
Extended European Search Report for EP Application No. 19185827.3, dated Dec. 4, 2019, pp. 7.

* cited by examiner

*Primary Examiner* — Michael P. Rodriguez
(74) *Attorney, Agent, or Firm* — Kinney & Lange, P.A.

(57) ABSTRACT

A method of determining an amount of imperfection in an additively manufactured material is disclosed herein. The method includes forming a sample piece constructed from the material during a same additive manufacturing cycle as a design piece constructed from the material, introducing a first electrical current to the sample piece while maintaining the sample piece at a reference temperature, and determining the amount of imperfection in the material depending on the measured resistance and the reference temperature of the sample piece.

16 Claims, 1 Drawing Sheet

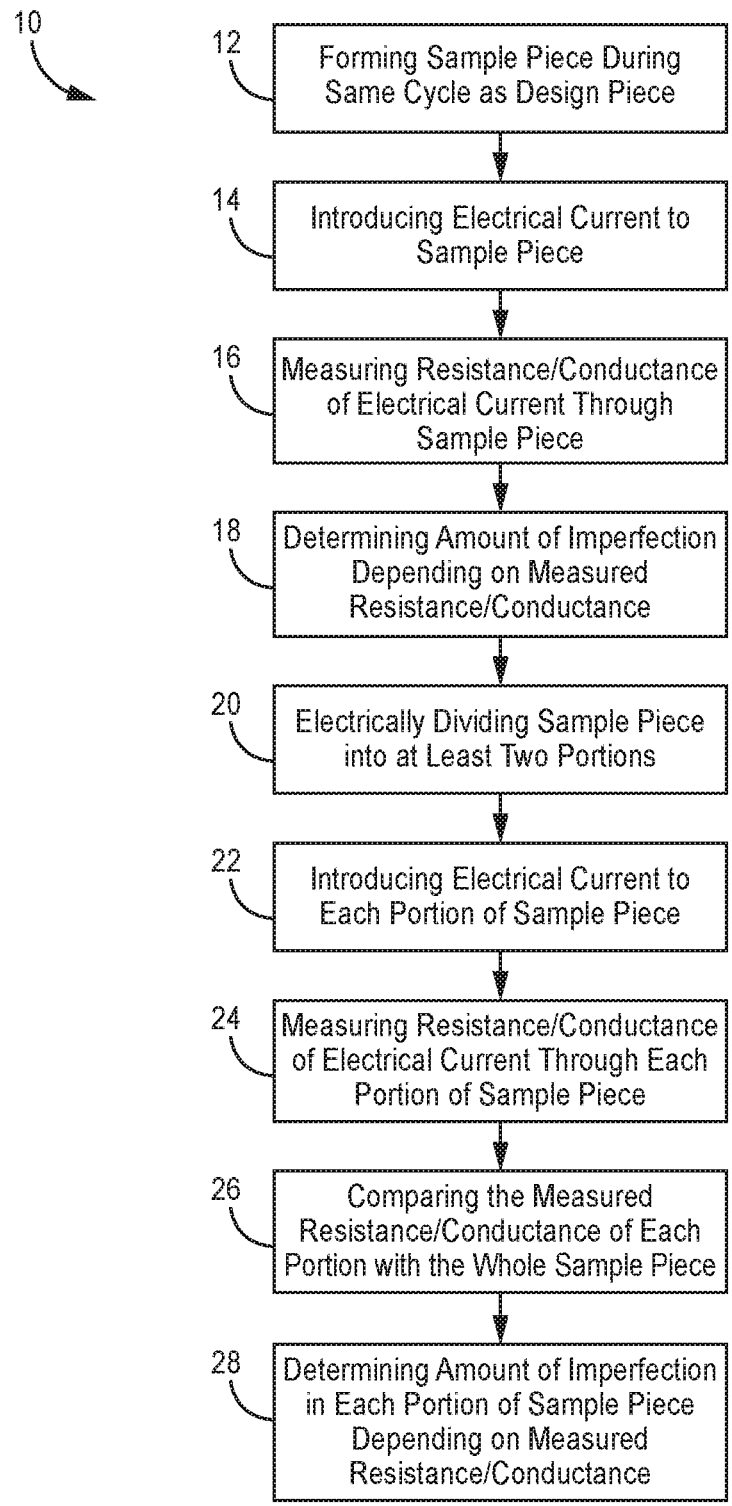

QUALITY TESTING OF ADDITIVE MANUFACTURED PRODUCT USING ELECTRICAL MEASUREMENTS

FIELD OF THE INVENTION

The present invention relates to quality testing of a design piece constructed through additive manufacturing and, in particular, to the use of an electrical current introduced to a sample piece to measure a resistance and conductance of a material from which the sample piece and design piece is constructed to determine a level of imperfections in the design piece.

BACKGROUND

Imperfections can develop in a design piece constructed by additive manufacturing. These imperfections can result from gas entrapment creating voids in the design piece, the additive manufacturing laser ineffectively melting the material from which the design piece is constructed, or other issues. Imperfections can lead to a design piece that has undesirable properties/characteristics such that the design piece cannot be used for its intended purpose. To determine whether the design piece has a level of imperfection that may cause undesirable properties, a sample piece is constructed along with the design piece with both the sample piece and design piece being constructed from the same material and through the same additive manufacturing process. A variety of tests are performed on the sample piece, such as a tensile test, to determine the level of imperfection in the material and therefore determine whether the corresponding design piece has desirable characteristics. However, testing of the sample piece is time consuming, requires expensive equipment, and results in destruction of the sample piece.

SUMMARY

A method of determining an amount of imperfection in an additively manufactured material is disclosed herein. The method includes forming a sample piece constructed from the material during a same additive manufacturing cycle as a design piece constructed from the material, introducing a first electrical current to the sample piece, measuring a resistance of the first electrical current through the sample piece, and determining the amount of imperfection in the material depending on the measured resistance of the sample piece.

Another method is disclosed for determining a level of imperfection of a design piece constructed by additive manufacturing. The method includes forming a sample piece and the design piece from a same material during a same additive manufacturing cycle, introducing a first electrical current to the sample piece, measuring a conductance of the first electrical current through the sample piece, and determining the level of imperfection in the material depending on the measured conductance and the reference temperature of the sample piece.

BRIEF DESCRIPTION OF THE DRAWINGS

FIG. 1 is a flow chart of a quality testing process using electrical measurements.

DETAILED DESCRIPTION

A quality testing process using electrical measurements is disclosed herein. The process determines a level of imperfection (e.g., impurities and porosity) in an additively manufactured design piece constructed from a specified material. Because imperfections can develop during the additive manufacturing process, it is important to determine the level of imperfection to then determine whether the design piece contains desirable properties/characteristics (e.g., strength) for the design piece's intended purpose. Previous methods utilize a sample piece that is then put through tensile testing, which destroys the sample piece so further testing cannot be performed. Additionally, tensile testing is time consuming, requires costly equipment, and requires the design piece to be quarantined while the tensile testing is being performed so that the design piece is not put into use before the design piece's strength, durability, etc. is known. The method disclosed herein can determine the level of imperfection quickly and without the need to destroy the sample piece. Additionally, the method can be performed while the sample piece and design piece are still being additively manufactured and while the pieces are still on the additive manufacturing base/platform. The method can be performed multiple times on the sample piece and can be performed on multiple portions/parts of the sample piece if the sample piece is electrically divided into portions by a measurement device (e.g., a clamp on a multimeter).

FIG. 1 is a flow chart of quality testing process 10 that uses electrical measurements. Quality testing process 10 includes the steps as described below. Depending on the material and additive manufacturing process used to form the sample piece and design piece and the level of material properties/characteristics desired to be known, certain steps may not need to be performed. Further, other steps not expressly mentioned below may be performed while still being included within the scope of this disclosure.

First, quality testing process 10 begins with step 12: forming the sample piece during the same additive manufacturing process/cycle as the design piece. By forming the sample piece and design piece from the same material (or materials) during the same additive manufacturing cycle, the sample piece should have the same properties as the design piece. Thus, testing the sample piece to determine the sample piece's properties in turn allows for the determination of the design piece's properties. Additionally, the sample piece can be equal in height to the design piece and/or equal in length to the design piece. Such a configuration ensures that an imperfection in the design piece that may occur only in one or a few layers along the height and/or length of the design piece is also present in the sample piece so that when the sample piece is tested, those imperfections are discovered. The layer imperfections could result from insufficient melting and bonding of layers, oxidization that causes unwanted voids/porosity, or other inconsistencies in the additive manufacturing process. The sample piece can have any shape for which a cross-sectional area is able to be calculated. However, a consistent cross-sectional area across the entire length and/or width can allow for an easier determination of resistance/conductance. For example, the sample piece can be a cylinder that is constructed vertically to a height that is equal to a height of the design piece. Additionally, one or more additional sample pieces can be constructed (such that there are multiple sample pieces per one design piece) with one being constructed horizontally to a length that is equal to a length of the design piece.

After the sample piece (or multiple sample pieces) has been formed/constructed, electrical current is introduced to the sample piece (step 14). Step 14 can be performed while maintaining the sample piece at a constant reference temperature. Maintaining the sample piece at the reference temperature during the steps 14 and 16 can increase the accuracy of a measurement of resistance/conductance and a determination of the amount of imperfection. Step 14 can be performed after the additive manufacturing process is completely finished or at one or multiple times during the additive manufacturing process. Step 14 (and subsequent steps) can be performed when the sample piece is within the additive manufacturing apparatus, such as when the sample piece is still on the build base/platform. However, the sample piece should be located such that the electrical current introduced to the sample piece does not flow to adjacent components. The electrical current can be introduced by any tool, such as a multimeter or LCR meter. The electrical current can be introduced at any point along the sample piece, but introducing the electrical current at one end and measuring that current at the other end may produce the most consistent and easily repeatable result, as well as detect most or all of the imperfections along the total length/height of the sample piece. The electrical current can be of any amperage suitable to allow for measurement of the resistance/conductance of the electrical current through the sample piece.

When electrical current is being introduced to the sample piece, step 16 is performed in that the resistance/conductance of the electrical current through the sample piece is measured. Resistance and conductance are inversely related to one another. Thus, the resistance can be easily determined from a measure of the conductance (and vice versa). The measurement can be performed by any suitable tool, including the multimeter or LCR meter used to introduce the electrical current to the sample piece. The tool used to introduce the electrical current and/or measure the resistance/conductance can be a tool known in the art. Because the multimeter and LCR meter are mobile, the measurement (and introduction of electrical current) can be performed anywhere the sample piece is located. Further, steps 14 and 16 can be performed relatively quickly as compared to a tensile test or other tests, which require the sample piece to be moved to a separate machine to undergo induced stresses, strains, etc. Introducing electrical current to the sample piece and measuring the resistance/conductance does not destroy or otherwise alter the sample piece, so steps 14 and 16 can be performed as many times as desired.

With the material used to construct the sample piece, the dimensional characteristics of the sample piece, and the resistance/conductance of the electrical current through the sample piece all being known after step 16, one can then determine the level of imperfection in the material of the sample piece (step 18). With this information, the level of imperfection of the material of the sample piece (and therefore the imperfection in the design piece) can be calculated because the total resistivity (or conductivity) is equal to the sum of the resistivity due to temperature (which can be kept constant and is known) and the resistivity due to imperfections in the material. Thus, a determination of the level of imperfection in the material of the sample piece, and therefore in the material of the design piece, is easily and quickly calculated. Obviously, an increase in the level of imperfection in the material increases the resistance and decreases the conductance of electrical current through the sample piece. The level of imperfection can be calculated by a computer processor or other means, or the level of imperfection can be determined using a look-up table of known levels of imperfection corresponding to the measured resistance/conductance, the reference temperature, and the material from which the sample piece is constructed. Because the sample piece and design piece are constructed from the same material during the same additive manufacturing cycle/process, the level of imperfection in the sample piece can be equated to the level of imperfection in the design piece. If the level of imperfection is undesirably high, the design piece could be rejected and a new design piece would then be constructed.

Further analysis can be performed on the sample piece by repeating steps 12-16 or by performing steps 20-28. These steps are very similar to steps 12-16, except that they can be performed on multiple portions/parts of the sample piece. To perform further analysis of the sample piece, step 20 is electrically dividing the sample piece into at least two portions. Step 20 can be performed by physically cutting the sample piece into multiple portions or by electrically isolating portions of the sample piece by placing a clamp (or another component) of a measurement device (e.g., a multimeter) at a point along the sample piece such that a portion on one side of the clamp is electrically isolated from a portion on the other side of the clamp. The sample piece can be electrically divided into any number of portions upon which further analysis is performed, and the sample piece can be electrically divided lengthwise, heightwise, or widthwise depending the further analysis desired. For example, if it is suspected that the sample piece (and also the design piece) includes layers of powder that did not melt and bond properly, the sample piece could be electrically divided in a direction parallel to that layer or series of layers. If it is suspected that the sample piece (and also the design piece) includes excessive voids and/or cracking, the sample piece can be electrically divided in a direction that encompasses those voids and/or cracks.

After being electrically divided into multiple portions, electrical current is then introduced to each portion of the sample piece (step 22). Step 22 is similar to step 14 except that step 22 involves multiple portions of the sample piece. Step 22 can be performed multiple times on each portion. Step 22 can be performed while each portion of the sample piece is maintained at a constant reference temperature.

When electrical current is being introduced to one of the portions, step 24 is then performed by measuring the resistance/conductance of that portion of the sample piece. Step 22 and step 24 are then performed for each portion of the sample portion to collect measurements of the resistance/conductance of electrical current through each portion individually.

Step 26 includes comparing the measured resistance/conductance of each portion of the sample piece to the measured resistance/conductance of the entire sample piece. Such a comparison can reveal if any of the portions include more imperfections than other portions (which could be indicative of imperfection due to improper melting and/or bonding of layers, one or multiple cracks in the sample piece, or other location dependent imperfections). If the resistance/conductance is similar among all portions of the sample piece, it could be indicative that the imperfections are caused by excessive voids or other imperfections that are located throughout the sample piece, not just in discrete locations. Other information can also be gleaned from the comparison of step 26.

In addition to or alternative to step 26, step 28 can be performed, which includes determining the level of imperfection of each portion of the sample piece. As stated above, the level of imperfection is dependent upon the resistance/conductance of the electrical current through each portion of the sample piece and the material forming each portion of the sample piece. The known level of imperfection of each portion of the sample piece can then be compared to the level of imperfection of the entire sample piece or further analyzed.

In performing quality testing process 10, one or multiple steps can be repeated to collect additional information on the material or other properties of the sample piece and design piece. Process 10 can be performed with any material that conducts electrical current sufficiently to allow for measurement of resistance/conductance. Quality testing process 10 allows for the determination of the level of imperfection in the additively manufactured design piece quickly and without the need to destroy the sample piece. Quality testing process 10 can be performed multiple times per sample piece, on a number of different sample pieces, and/or on multiple portions of the sample piece without the need for additional testing equipment other than a multimeter, LCR meter, or another testing apparatus.

Discussion of Possible Embodiments

The following are non-exclusive descriptions of possible embodiments of the present invention.

A method of determining an amount of imperfection in an additively manufactured material is disclosed herein. The method includes forming a sample piece constructed from the material during a same additive manufacturing cycle as a design piece constructed from the material, introducing a first electrical current to the sample piece, measuring a resistance of the first electrical current through the sample piece, and determining the amount of imperfection in the material depending on the measured resistance of the sample piece.

The method of the preceding paragraph can optionally include, additionally and/or alternatively, any one or more of the following features, configurations, steps, and/or additional components:

The step of introducing the first electrical current is performed while maintaining the sample piece at a reference temperature.

The step of determining the amount of imperfection in the material is performed using a look-up table of known amounts of imperfection corresponding to the measured resistance and the reference temperature.

A height of the sample piece is equal to a height of the design piece.

A length of the sample piece is equal to a length of the design piece.

The steps of introducing the first electrical current and measuring the resistance are performed by a multimeter.

Placing a measurement device at a point along the sample piece to electrically divide the sample piece into at least two portions, introducing a second electrical current to each of the at least two portions of the sample piece, and measuring a resistance of the second electrical current through each of the at least two portions of the sample piece.

Comparing the measured resistance of the second electrical current through each of the at least two portions of the sample piece to the measured resistance of the first electrical current through the whole sample piece.

Determining the amount of imperfection in the material of each of the at least two portions of the sample piece depending on the measured resistance of each of the at least two portions of the sample piece.

The steps of introducing the first electrical current and measuring the resistance are performed by an LCR meter.

Another method is disclosed for determining a level of imperfection of a design piece constructed by additive manufacturing. The method includes forming a sample piece and the design piece from a same material during a same additive manufacturing cycle, introducing a first electrical current to the sample piece, measuring a conductance of the first electrical current through the sample piece, and determining the level of imperfection in the material depending on the measured conductance and the reference temperature of the sample piece.

The method of the preceding paragraph can optionally include, additionally and/or alternatively, any one or more of the following features, configurations and/or additional components:

The step of introducing the first electrical current further includes maintaining the sample piece at a reference temperature while introducing the first electrical current.

The step of determining the level of imperfection further includes using a look-up table of known levels of imperfection corresponding to the measured conductance and the reference temperature for the material.

A build height of the sample piece is equal to a build height of the design piece.

A build length of the sample piece is equal to a build length of the design piece.

The steps of introducing the first electrical current and measuring the conductance are performed by a multimeter.

The steps of introducing the first electrical current and measuring the conductance are performed by a LCR meter.

Electrically dividing the sample piece into a first part and a second part, introducing a second electrical current into the first part, measuring a conductance of the second electrical current through the first part, and comparing the measured conductance through the first part to the measured conductance of the first electrical current through the whole sample piece.

Introducing a third electrical current to the second part, measuring a conductance of the third electrical current through the second part, and comparing the measured conductance through the second part to the measured conductance of the first electrical current through the whole sample piece.

Electrically dividing the sample piece into the first part and the second part includes placing a clamp of a measurement device at a point along the sample piece to electrically divide the sample piece into the first part and the second part.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of determining an amount of imperfection in an additively manufactured material, the method comprising:
    forming a sample piece constructed from the material during a same additive manufacturing cycle as a design piece constructed from the material, a height of the sample piece being equal to a height of the design piece;

introducing a first electrical current to the sample piece while maintaining the sample piece at a reference temperature;

measuring a resistance of the first electrical current through the sample piece; and determining the amount of imperfection in the material depending on the measured resistance and the reference temperature of the sample piece.

2. The method of claim 1, wherein the step of determining the amount of imperfection in the material is performed using a look-up table of known amounts of imperfection corresponding to the measured resistance and the reference temperature.

3. The method of claim 1, wherein a length of the sample piece is equal to a length of the design piece.

4. The method of claim 1, wherein the steps of introducing the first electrical current and measuring the resistance are performed by a multimeter.

5. The method of claim 1, further comprising:

placing a measurement device at a point along the sample piece to electrically divide the sample piece into at least two portions;

introducing a second electrical current to each of the at least two portions of the sample piece; and measuring a resistance of the second electrical current through each of the at least two portions of the sample piece.

6. The method of claim 5, further comprising:

comparing the measured resistance of the second electrical current through each of the at least two portions of the sample piece to the measured resistance of the first electrical current through the whole sample piece.

7. The method of claim 5, further comprising:

determining the amount of imperfection in the material of each of the at least two portions of the sample piece depending on the measured resistance of each of the at least two portions of the sample piece.

8. The method of claim 1, wherein the steps of introducing the first electrical current and measuring the resistance are performed by an LCR meter.

9. A method for determining a level of imperfection of a design piece constructed by additive manufacturing, the method comprising:

forming a sample piece and the design piece from a same material during a same additive manufacturing cycle, a build length of the sample piece being equal to a build length of the design piece;

introducing a first electrical current to the sample piece while maintaining the sample piece at a reference temperature;

measuring a conductance of the first electrical current through the sample piece; and determining the level of imperfection in the material depending on the measured conductance and the reference temperature of the sample piece.

10. The method of claim 9, wherein the step of determining the level of imperfection further comprises:

using a look-up table of known levels of imperfection corresponding to the measured conductance and the reference temperature for the material.

11. The method of claim 9, wherein a build height of the sample piece is equal to a build height of the design piece.

12. The method of claim 9, wherein the steps of introducing the first electrical current and measuring the conductance are performed by a multimeter.

13. The method of claim 9, wherein the steps of introducing the first electrical current and measuring the conductance are performed by a LCR meter.

14. The method of claim 9, further comprising:

electrically dividing the sample piece into a first part and a second part;

introducing a second electrical current into the first part;

measuring a conductance of the second electrical current through the first part; and comparing the measured conductance through the first part to the measured conductance of the first electrical current through the whole sample piece.

15. The method of claim 14, further comprising:

introducing a third electrical current to the second part;

measuring a conductance of the third electrical current through the second part; and comparing the measured conductance through the second part to the measured conductance of the first electrical current through the whole sample piece.

16. The method of claim 15, wherein electrically dividing the sample piece into the first part and the second part includes placing a clamp of a measurement device at a point along the sample piece to electrically divide the sample piece into the first part and the second part.

* * * * *